United States Patent [19]

Scherping

[11] Patent Number: 4,703,935

[45] Date of Patent: Nov. 3, 1987

[54] EXPANSIBLE DUCT SEAL CONSTRUCTION FOR BATCH MIXERS AND THE LIKE

[75] Inventor: Clarence K. Scherping, Saginaw, Mich.

[73] Assignee: Baker Perkins, Inc., Saginaw, Mich.

[21] Appl. No.: 840,157

[22] Filed: Mar. 17, 1986

[51] Int. Cl.[4] .......................... F16J 13/02; F16J 15/46

[52] U.S. Cl. .......................................... 277/1; 277/3; 277/12; 366/347

[58] Field of Search ...................... 277/1, 3, 27, 12, 32; 366/347

[56] References Cited

U.S. PATENT DOCUMENTS

| | | | |
|---|---|---|---|
| 3,302,608 | 2/1967 | Coons et al. | 366/347 X |
| 3,324,628 | 6/1967 | Natelson | 366/347 X |
| 3,328,039 | 6/1967 | McKeough | 277/3 |

FOREIGN PATENT DOCUMENTS

| | | | |
|---|---|---|---|
| 532095 | 10/1956 | Canada | 366/347 |
| 2914773 | 10/1979 | Fed. Rep. of Germany | 277/3 |

*Primary Examiner*—Robert S. Ward

*Attorney, Agent, or Firm*—Learman & McCulloch

[57] ABSTRACT

An expansible duct seal construction for a batch mixer vessel with a cover clamped to the open end of the vessel wherein a flexible duct perimetrally surrounds the cover and the end portion of the vessel adjacent the cover, the duct being secured to the sides of the vessel and including an expansion fold around its perimeter secured to the cover in a manner to prevent the escape of vaporous material. A gas under pressure is provided in the duct to balance the pressure in the duct with the gaseous pressure in the vessel and inhibit the migration of material from the vessel in the preferred form of the invention.

14 Claims, 5 Drawing Figures

EXPANSIBLE DUCT SEAL CONSTRUCTION FOR BATCH MIXERS AND THE LIKE

BACKGROUND OF THE INVENTION

This invention relates to expansible duct seal constructions for mixers of the type wherein various mixing and reacting is occurring, for example, mixers in which reactants produce fumes which cannot be allowed to escape into the atmosphere of the plant where mixing is occurring. One of the problems encountered with conventional large batch mixers and processors which, for instance, are using processing temperatures which may reach 700° F., is gas leakage due to the fact of differential thermal expansion of the mixer vessel and its cover. Presently, covers for these mixers have been bolted around their rectangular perimeter to the lateral flange provided on the upper end of the mixer housing, and the openings in the cover for the bolts have been enlarged to permit relative movement. While the obvious solution to the problem is to circulate a temperature changing, heating medium to the cover, it has been determined that this is not a viable solution to the problem, because, when the batch of reactants are loaded to the mixers, frothing and splashing causes some material to stick to the cover. If the cover were as hot as the vessel, this material would react and finally char, and then drop off into subsequent batches causing irreversible combination.

Another approach to solving the problem involves running the reaction process at slightly over atmospheric pressure to reduce the volume of fumes which escape. This may result in an altered product when the process should be run at a pressure slightly below atmospheric pressure, and, of course, the escape of fuming acid and other products is to be avoided, since it seriously deteriorates the working environment.

SUMMARY OF THE INVENTION

One of the prime object of the present invention is to provide a solution to the problem which permits the reactant processor to operate under the temperature and pressure conditions required to produce the best possible product, and to provide a sealed cover construction which, at the same time, prevents the escape of noxious fumes from the vessel interior to surrounding atmosphere.

It is a further object of the invention to solve the problem in a reliable manner which does not involve an expensive re-design of the vessel or cover.

Still another object of the invention is to provide a solution to the problem which will not require the continual removal of the cover and replacement of the gasket.

The solution to the problem which will be described provides a sheet metal duct, which can be welded to the vessel and the cover to seal off the perimeter of the cover, and which includes an expansible portion which can move to accommodate differential temperature expansion of the vessel relative to the cover. While the duct may be connected to a scrubber and vent stack dependent on whether the process in vessel V is being carried out under a negative or positive pressure, an inert gas under pressure, such as nigrogen, is maintained in the duct in the preferred form of the invention to provide a back pressure which keeps the fumes in the vessel without interfering with the reaction process.

Thus, another important object of the preferred form of the invention is to provide a system which provides a perimetral duct which not only can grow laterally, but also provides an equalization of the pressure in the duct and vessel interior to prevent the migration of vapor and particles of material.

Other objects and advantages of the invention will become apparent with reference to the accompanying drawings:

IN THE DRAWINGS

Figure 1:
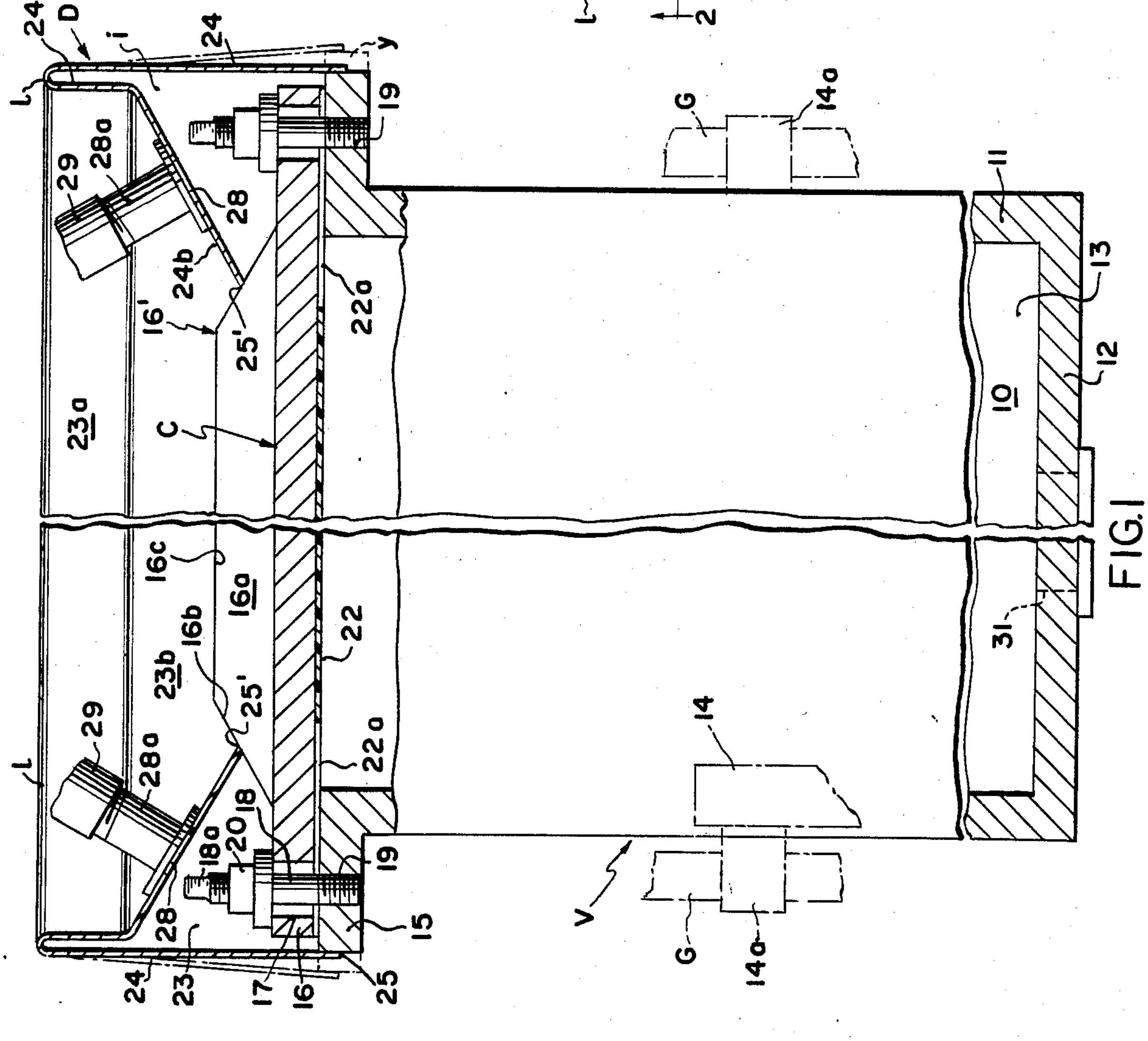
FIG. 1 is a somewhat schematic, sectional, elevational view taken on the line 2—2 of FIG. 2.

Referring now, more particularly to the accompanying drawings, a typical mixer vessel V, shown in FIG. 1, comprises side walls 10 connected by end walls 11, and a bottom wall 12, all of which are integrated to form a mixing chamber 13. It is to be understood that the vessel V may house rotatable mixer blades 14 of sigma or other suitable configuration in side-by-side intermeshing configuration, such as shown, for example, in U.S. Pat. No 3,200,880 which I incorporate herein by reference. In such mixers, the preferably jacketed vessel may be heated by circulating steam or hot oil through its jacket, or otherwise suitably heated, and the blades 14 and their shafts 14*a* may also be tubular to permit the delivery of heat exchange fluid on a continuously circulating basis. The heat exchange medium used may also comprise steam or hot oil, but other fluids, such as water, or refrigerants, could, of course, be utilized dependent upon the particular process. As indicated, the shafts 14*a* of the mixer blades may be driven at required mixing material reacting speed by synchronized chain drives or gearing, generally designated G, which connect to a suitable electric motor, while revolving the shafts 14*a* at the desired speeds.

At the upper end of vessel V, a lateral flange 15 is provided in the usual manner to facilitate the installation of a cover, generally designated C, which is secured to the flange 14. The cover C comprises a perimetral, lateral flange 16, surrounding a dome-shaped portion generally designated 16' which is made up of sloped side and end walls 16*a* and 16*b* respectively extending between the upper surface of the flange 16 and the top surface 16*c* dome-shaped portion.

Provided in spaced apart relation along all sides of the perimetral flange 16, are a series of openings 17 which are enlarged as shown relative to the threaded studs 18 which extend through them, and are threaded into threaded openings 19 provided in vessel flange 15. A nut 20 and washer 21 clamp the cover C, and a perimetral, rectangular gasket 22, which is sandwiched between the flanges 15 and 16, to the flange 15. It will be noted that slits 22*a* which extend to the perimeter of gasket 22 are provided in the gasket 22 at perimetrally spaced intervals, for a purpose later to be described. Several slits 22*a* are provided in each side of gasket 22.

Provided to enclose the flanges 15 and 16 perimetrally is a duct generally designated D, which is constructed of a flexible, stainless steel, sheet metal about 0.032 to 0.048 of an inch in thickness, in the preferred form of the invention, so that it can be welded in position. Duct D includes perimetral side and end sections, generally designated S and E, which have side and end perimetral walls 23 and 24 which are seam welded along their lower edges as at 25 to the perimetral edges of flange 15. The walls 23 and 24 extend upwardly from the flange 15 a considerable distance above the upper ends of studs 18, which have square heads 18*a*, and are reversely turned, as at 23*a* and 24*a*, to form loop sections l which connect to inwardly and downwardly sloped wall sections 23*b* and 24*b* which extend above the stude 18. The inner ends of the portions 23*b* and 24*b* are seam welded to the dome portions 16*a* and 16*b* at 25′.

Figure 3:
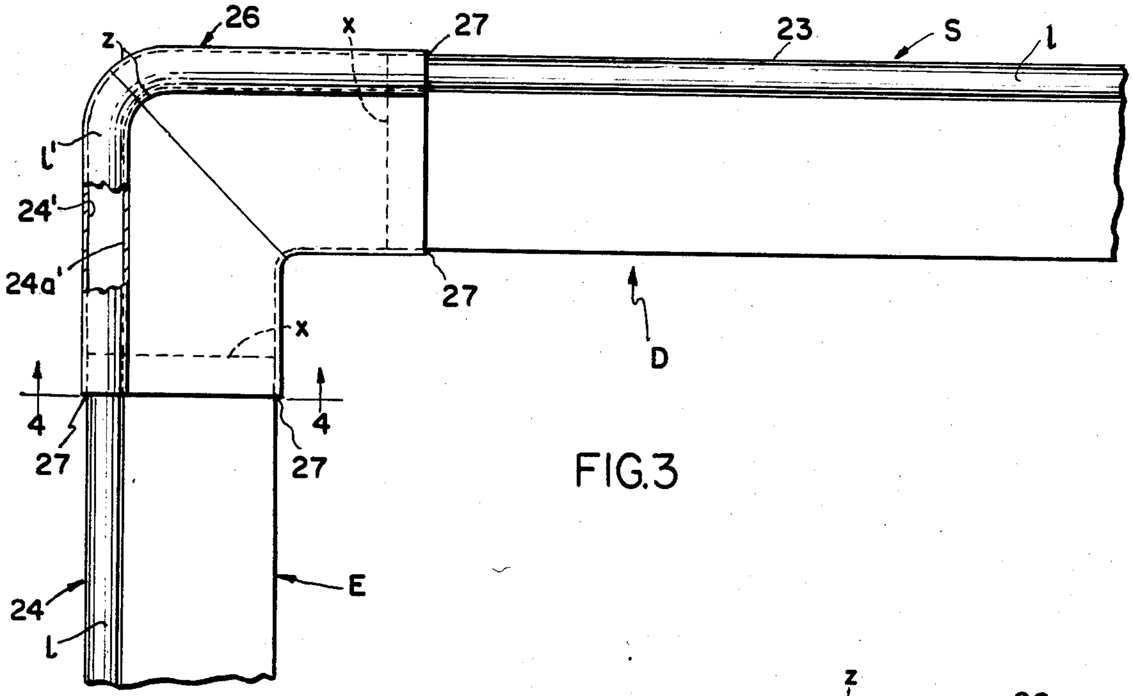
FIG. 3 is an enlarged, fragmentary view illustrating the corner contruction of the perimetral duct seal.
Figure 4:
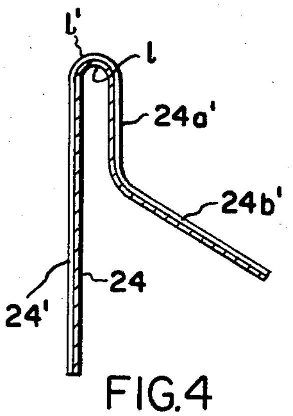
FIG. 4 is a fragmentary, transverse, sectional view taken on the line 4—4 of FIG. 3.
Figure 5:
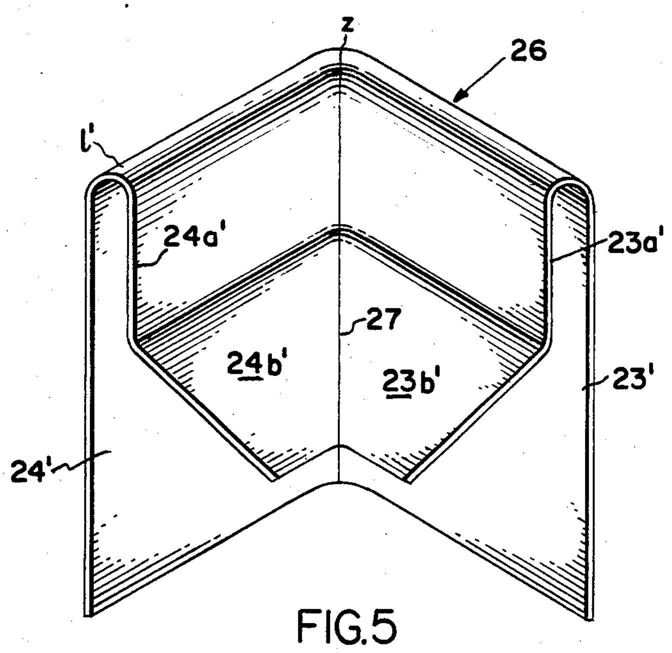
FIG. 5 is a perspective elevational view illustrating one of the corner formimg members.

As FIG. 3 particularly indicates, the side and end sections S and E, respectively, do not extend to abutting engagement. Rather, they are cut away as at x, and mating corner sections, generally designated 26, are provided which have similar walls 23′, 24′, 23*a*′, 24*a*′, 23*b*′, 24*b*′ and loops l. At their junctures the walls 23′-24′, 23*a*′-24*a*′, and 23*b*′-24*b*′ are well radiused as at z. The side and end wall sections 23 and 24 are tightly received within the mating corner sections 26, as shown particularly in FIGS. 3 and 4, and the wall portions 23′, 24′, 23*b*′ and 24*b*′ of the corner sections 26 are seam welded to the flange 15 and walls 16*a* and 16*b* respectively in the same manner as wall portions 23, 24, 23*b* and 24*b*. The wall seams between the corner sections 16 and the side and end wall sections S and E, comprising the junctures of the walls 23–23′, 24–24′, 23*a*–23*a*′, 23*b*–23*b*′, 24*a*–24*a*′, and 24*b*–24*b*′ are seam welded as at 27 to provide a leak proof construction for duct D.

Provided in the walls 23*b* and 24*b* are openings 28 communicating with fittings 28*a* which are welded to the wall sections 23*b* and 24*b*, and are connected with hoses or pipes 29, leading, in a preferred form of the invention, to a source of gas under pressure, for example, a source of nitrogen, which is maintained at a pressure slightly above atmospheric pressure. The fittings 28*a*, thus, preferably fill the interior of duct D with nitrogen, and, since there is communication with the duct D, via slits 22*a* in the gasket 22, the migration of fumes or material from the interior of vessel V is prevented by this gaseous mantle. Dependent on the process being carried out in vessel V, the pipes 29 could lead to a conventional scrubber and vent pipe.

Figure 2:
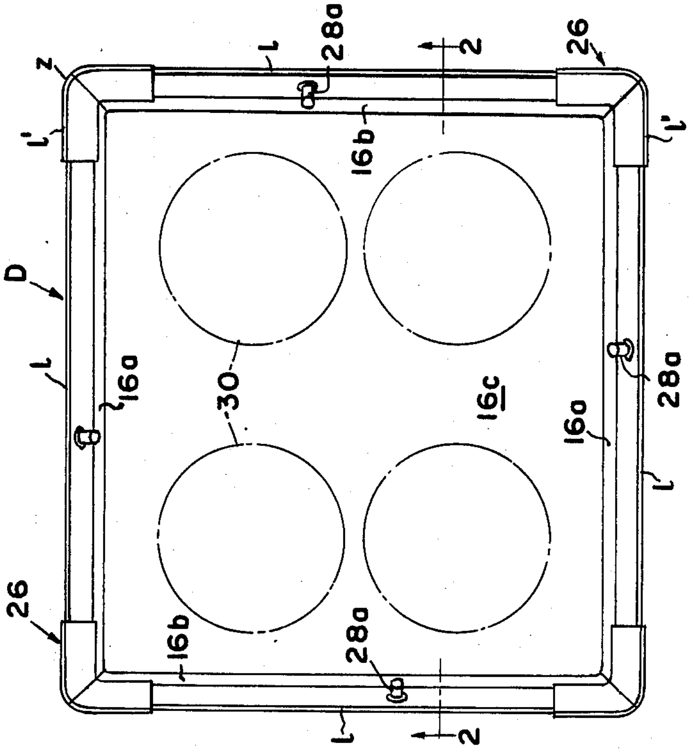
FIG. 2 is a partly schematic, top-plan view thereof on a somewhat reduced scale.

Inlet openings for the periodic introduction of reacting elements are shown diagrammatically in FIG. 2 at 30. It is to be understood that these openings 30, or some of them, may be covered by releasable manhole type covers which seal the openings 30 when the batch is being processed. Pipes for supplying reactants may load to some of the openings 30 in some processes. Discharge openings 31 are typically provided in the vessel bottom 12, and it is to be understood that these openings are also normally sealed by suitable covers when the mixer is in operation.

In operation, the duct D and the greater pressure maintained in the interior i of duct D in the preferred form of the invention, which communicates with the interior 10 of vessel V through slits 22*a*, effectively prevents fumes generated in the vessel V from escaping to the plant area surrounding the mixer. The loops l formed at the upper end of the duct D provided flexing, resilient, expansion joints, which react to permit relative movement between the cover C and vessel V due to differential temperature conditions. For example, in FIG. 1, the chain lines Y show an expanded position of the vessel flange 15, which might indicate as much as a half an inch of growth relative to the cover C, which is not as hot and, further, may be constructed of different material, and which then requires corresponding compensating expanding movement of the walls 23, 24, 23′ and 24′, and flexing of the flexible loop portions l and l′.

It has been determined that the present construction very satisfactorily solves the problems in an expeditious and economic manner, and renders the batch mixer much safer for operation within an enclosed processing plant.

While one embodiment of the invention has been described in detail, it will be apparent to those skilled in the art that the disclosed embodiment may be modified. Therefore, the foregoing description in all aspects is tobe considered exemplary rather than limiting in any way, and the true scope of the invention is that defined in the following claims.

I claim:

1. An expansible duct seal construction for a batch mixer vessel with a cover clamped to the open end of the vessel comprising:
   - a. a flexible duct, perimetrally surrounding said cover and the end portion of said vessel adjacent the cover, the duct having a perimetral wall extending generally parallel to the sides of the vessel and secured to the sides of the vessel around the perimeter thereof in a manner to prevent the escape of vaporous material; said duct includ-ing an expansion fold around its perimeter formed by a wall section inward of said perimeter wall extending in a reverse direction to said perimeter wall and connected thereto at a spaced distance therefrom; said duct including also a wall extending generally radially inwardly and secured to said cover in a manner to prevent the escape of vaporous material;
   - b. and means for supplying a gas under pressure to said duct to balance the pressure in said duct with the gaseous pressure in said vessel and inhibit the migration of material from said vessel.

2. The invention defined in claim 1 wherein said cover has a centrally disposed dome having a perimetral side wall and said generally radially extending duct wall is secured to said perimetral side wall of the dome, the said means for supplying a gas comprising an inlet fitting in said generally radially extending duct wall detachably receiving a line transmitting said gas under pressure.

3. The invention recited in claim 2 wherein said vessel has a laterally extending perimetral flange and said cover secures to said flange perimetrally outwardly of said dome, said cover having enlarged openings and securing members, of smaller diameter than said openings, extending through said openings to provide room for differential expansion of said cover and vessel.

4. The invention recited in claim 3 wherein a gasket is provided between said cover and flange which has slots extending from the perimeter thereof inwardly beyond said flange to communicate said duct with the mixer vessel interior.

5. The invention recited in claim 4 wherein said vessel has side-by-side intermeshing mixer blades therein, and said vessel and duct are rectangular in configuration.

6. The invention recited in claim 1 wherein said duct includes side sections received by corner sections of the same cross-section which are welded thereto and to said sides of the vessel and cover.

7. A method of preventing the migration of vaporous material from a batch mixer vessel with a cover clamped to the open end of the vessel comprising the steps of:

a. sealably securing a flexible duct which perimetrally surrounds said cover and the portion of said vessel adjacent the cover, and has an expansion fold around its perimeter, to the sides of the vessel, and to said cover, in a manner to prevent the escape of vaporous material;

b. and supplying a gas to said duct under a pressure to balance the pressure in said duct with the gaseous pressure in said vessel and inhibit the migration of material from said vessel.

8. An expansible duct seal construction for a batch mixer vessel with a cover having a lateral flange clamped to the open end of the vessel by securing members permitting temperature caused, differential expansion of the flange and cover comprising a flexible, corrosion resistant, vapor-impermeable, sheet metal-like duct, perimetrally surrounding said cover and the end portion of said vessel adjacent the cover, said duct having a perimetral wall extending generally parallel to the sides of the vessel and secured to the sides of the vessel around the perimeter thereof in a manner to prevent the escape of vaporous material; said duct including an integral expansion fold extending around said perimeter wall, and a wall extending generally radially inwardly above said securing members which is secured to said cover in a manner to prevent the escape of vaporous material.

9. The invention defined in claim 8 wherein said cover has a centrally disposed dome having a perimetral side wall structure, and said generally radially extending duct wall is secured to said perimetral side wall structure of the dome.

10. The invention recited in claim 9 wherein said vessel has a laterally extending perimetral flange and said cover secures to said flange perimetrally outwardly of said dome, said cover having enlarged openings and securing members, of smaller diameter than said openings, extending through said openings to provide room for differential expansion of said cover and vessel.

11. The invention recited in claim 10 wherein a gasket is provided between said cover and flange which has slots extending from the perimeter thereof inwardly beyond said flange to communicate said duct with the mixer vessel interior.

12. The invention recited in claim 11 wherein said vessel has side-by-side intermeshing mixer blades therein, and said vessel and duct are rectangular in configuration.

13. The invention recited in claim 12 wherein said duct includes side sections received by corner sections of the same cross-section which are welded thereto, and to said sides of the vessel and cover.

14. A method of preventing the migration of vaporous material from a batch mixer vessel, with a cover clamped to the open end of the vessel, to the room in which the mixer vessel is located comprising the steps of:

a. sealably securing a flexible duct which perimetrally surrounds said cover and the portion of said vessel adjacent the cover and has an expansion fold around its perimeter, to the sides of the vessel, and to said cover, in a manner to prevent the escape of vaporous material;

b. and communicating with said duct to egress any noxious materials therein and remove them for treatment and venting to the outside atomsphere.

* * * * *

UNITED STATES PATENT AND TRADEMARK OFFICE
CERTIFICATE OF CORRECTION

PATENT NO. : 4,703,935

DATED : November 3, 1987

INVENTOR(S) : Clarence K. Scherping (Baker Perkins)

It is certified that error appears in the above-identified patent and that said Letters Patent is hereby corrected as shown below:

Column 2, line 17, change "contruction" to -- construction -- .

Column 2, line 53, insert -- of the -- after "16c" .

Column 3, line 53, change "load" to -- lead -- .

Column 4, line 30, change "includ-ing" to -- including -- .

Signed and Sealed this

Twelfth Day of April, 1988

*Attest:*

DONALD J. QUIGG

*Attesting Officer*

*Commissioner of Patents and Trademarks*